Jan. 2, 1968  T. D. WATSON  3,361,938
ELECTRICAL SWITCH BOX FOR MOBILE HOME SERVICE
Filed Feb. 1, 1967
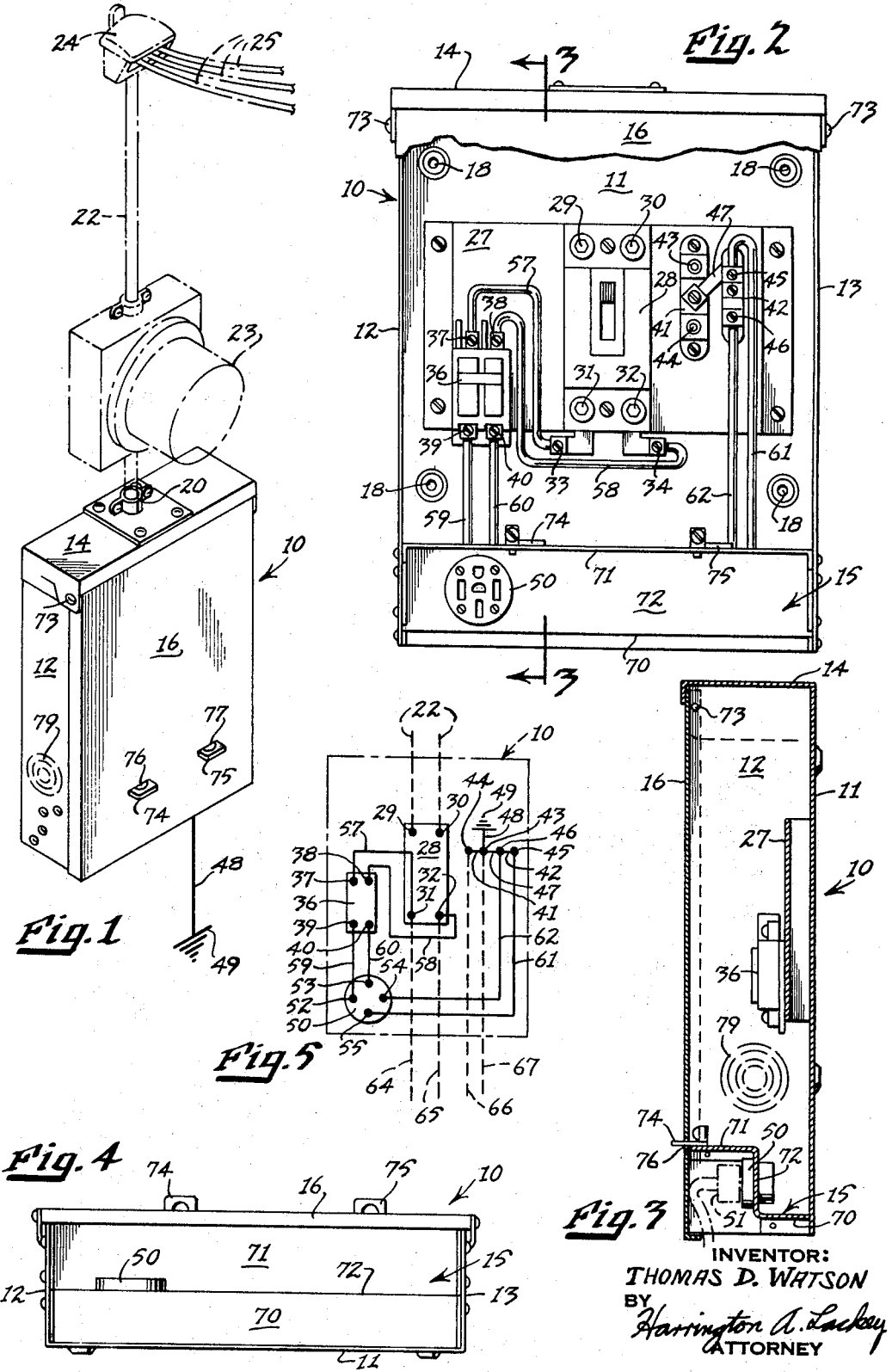
INVENTOR:
THOMAS D. WATSON
BY Harrington A. Lackey
ATTORNEY 3,361,938
ELECTRICAL SWITCH BOX FOR
MOBILE HOME SERVICE
Thomas D. Watson, 1145 Hunter Lane,
Nashville, Tenn. 37207
Filed Feb. 1, 1967, Ser. No. 613,164
2 Claims. (Cl. 317—120)

ABSTRACT OF THE DISCLOSURE

A switch box having a plurality of outlet means of different amperages, at least one of the outlet means including an outlet receptacle which is exposed for connection with an external plug when the cover of the box is open, and which is partially concealed when the cover is closed.

Background of the invention

This invention relates to an electrical switch box to provide alternative amperage service for mobile homes.

In the rapidly growing field of mobile homes, a greater number of electrical appliances and other types of electrical loads are being designed into many of the homes. Because of the differences in types and numbers of the appliances and electrical loads for the various types of mobile homes, there is a comparable disparity in demand for the electrical power or amperage service for each home. Most trailer parks provide a single service for each mobile home of a specified amperage, such as 100 amps. Thus, any home having electrical service requirements greater than 100 amps cannot use the single 100-amp service. Consequently, additional electrical work or improvising on the part of the trailer park is required to produce the additional service. Some trailer parks have overcome this problem by mounting additional switch boxes, each providing a different amperage service, on one pole to accommodate any particular mobile home parking in that area. The expense of so many boxes and services for each mobile home, so many of which must remain idle, is apparent.

Summary of the invention

This invention overcomes the above disadvantages by providing a single switch box including sufficient switches of different amperages and a corresponding number of outlets so that the electrical conduits of the mobile home can be connected to one box and be supplied with the service which its electrical load requires.

It is one object of this invention to mount at least one outlet receptacle in a recessed portion of one wall of the box, which is fully exposed to view and accessible for receiving a mating plug of the supply conduit from the mobile home when the cover of the box is open. However, when the cover of the box is closed, the outlet receptacle is partially concealed to render the outlet and the plug received in the outlet inaccessible to unauthorized personnel, or at least sufficiently inaccessible that the plug cannot be removed from the receptacle when the cover is secured in a closed position.

Brief description of the drawings

FIG. 1 is a front perspective view of the switch box made in accordance with this invention as it would appear mounted on a service pole, not shown, and connected to the electrical meter and power supply;

FIG. 2 is an enlarged front elevation of the switch box, with the cover partially broken away;

FIG. 3 is a section taken along the line 3—3 of FIG. 2;

FIG. 4 is a bottom plan view of the switch box disclosed in FIG. 2; and

FIG. 5 is an electrical circuit diagram of the invention.

Description of the preferred embodiments

Referring now to the drawings in more detail, FIG. 1 discloses the electrical switch box 10 made in accordance with this invention for providing multiple service to a mobile home. The switch box 10 includes a back wall 11, opposite side walls 12 and 13, top wall 14, bottom wall 15 and front cover 16. Bolt or screw holes 18 are formed in the back wall 11 for receiving bolts or screws for attachment to any type of flat support, such as wooden board, not shown, which may in turn be mounted on a service pole, not shown.

Extending through an opening 20 in the top wall 14 are the service entrance conductors 22 extending through meter 23 to the service entrance head 24. Power is supplied to the service entrance head 24 from any convenient source of power, such as utility lines, through the service drop wires 25.

Mounted upon a support plate 27 fixed to the back wall 11 is the main switch 28, including a circuit breaker, and of a conventional type. The main switch 28 is designed to provide a predetermined service, such as 200 amps. The main switch 28 includes two inlet contacts 29 and 30 for connection to the two power service entrance conductors 22, as illustrated in FIG. 5. The main switch 28 also is provided with a pair of outlet contacts 31 and 32, each provided with a contact extension 33 and 34, respectively.

Also mounted on the support plate 27 is a secondary switch 36, including a circuit breaker, and also being of a conventional type. The secondary switch 36 has a different amperage rating, such as 50 amps or 100 amps, from the amperage rating of the main switch 28.

Also mounted on the support plate 27 is a main ground bar 41 and a secondary ground bar 42. The main ground bar 41 is provided with a neutral contact 43 and an equipment ground contact 44. In a similar manner, the secondary ground bar 42 is provided with a neutral ground contact 45 and an equipment ground contact 46. Both ground bars 41 and 42 may be grounded in any conventional manner, such as by connection to each other through the bridge conductor 47, and by connection of one of the ground bars, such as 41 (FIG. 5), through the ground wire 48 to ground 49 (FIGS. 1 and 5).

Fixed in the bottom wall 15 is an outlet receptacle 50 adapted to receive in electrical engagement a mating plug 51 (FIG. 3). As shown in FIG. 5, the plug 50 is provided with four electrical contacts 52, 53, 54 and 55.

Forming a part of the permanent equipment of the switch box 10 are electrical conduits 57, 58, 59 and 60. Conduit 57 connects main switch outlet contact 31, through its extension 33, to secondary switch inlet contact 37. Conduit 58 connects main switch outlet contact 32, through its extension 34, to secondary switch inlet contact 38. Conduit 59 connects the secondary switch outlet contact 39 to contact 52 of the outlet receptacle 50, while conduit 60 connects the secondary switch outlet contact 40 to the receptacle contact 53.

The secondary neutral conduit 61 and the secondary ground equipment conduit 62 are also a permanent part of the equipment for the box 10. The neutral conduit 61 connects the neutral contact 45 of the secondary ground bar 42 to contact 55 of outlet receptacle 50, while ground equipment conduit 62 connects the secondary bar contact 46 to the receptacle contact 54.

The main switch outlet contacts 31 and 32 and the main ground bar contacts 44 and 43 are adapted to receive the corresponding hot wires 64 and 65 and equipment ground lead 66 and neutral lead 67 (FIG. 5) from the circuit of a mobile home requiring the higher amperage service provided by the main switch 28. Of course, if the leads 64, 65, 66 and 67 are connected to a plug, then a main outlet receptacle, similar to the secondary outlet receptacle 50 may be fixed in the bottom wall 15 with its four contacts being respectively connected through conduits to the main switch contacts 31, 32 and main ground bar contacts 44 and 43.

It will thus be seen that the single switch box 10 can accommodate the electrical service requirements whether they be in the order of 200 amps as provided by the main switch 28, or the lower amperage of 50 or 100 amps provided by the secondary switch 36.

Another important feature of this invention is the mounting of the outlet receptacle 50 in the bottom wall 15 so that its electrical connection with the plug 51 will be relatively inaccessible when the cover 16 is closed and locked.

As best disclosed in FIGS. 2, 3 and 4, the bottom wall 15 is shaped to form three distinct portions, namely, the rear portion 70 which engages the rear wall 11, the offset portion 71 which terminates against the front cover 16 in closed position, and the partition portion 72 which connects the rear portion 70 and the offset portion 71. The partition portion 72 is disposed substantially parallel to and spaced from the front cover 16 in closed position, so that the partition portion 72, the offset portion 71 and the bottom portion of the cover 16 provide a recess for receiving the plug 51 when electrically engaging the outlet receptacle 50. The receptacle 50 is fixed in the partition portion 72 so that it opposes the cover 16. The spacing between the partition portion 72 and the front cover 16 is sufficient to prevent unauthorized persons from extracting the plug 51 from the outlet receptacle 50 when the cover 16 is closed and locked or otherwise secured. However, when the cover 16 is swung to an open position about its hinge pins 73, then the outlet receptacle 50 will be completely exposed and conveniently accessible to receive the plug 51.

Although various spacings could be employed between the partition portion 72 and the closed front cover 16, depending upon the height of the plug 51 or the stiffness of the electrical conduit or cable to which the plug 51 is connected, nevertheless a preferred spacing would be a distance between the receptacle face 50 and the inside surface of the cover 16 which is less than the distance between the back of the plug head, that is, where the plug head receives its conduit, and the tips of the plug prongs. Thus, such spacing would prevent the plug prongs from leaving the mating openings in the receptacle 50, even if the plug is partially removed, because the back of the plug head 51 would abut against the front cover 16, when closed.

It will also be noted, particularly in FIGS. 2 and 3, that the space between the partition portion 72 and the back wall 11 provides a convenient and concealed area for receiving the ground and neutral conduits 61 and 62 leading to the receptacle 50.

Furthermore, the recessed area between the partition portion 72, offset portion 71 and the front cover 16 protects the outlet 50 from the elements of the weather as well as dirt and other foreign matter.

Fixed to the inside of the offset portion 71 are a pair of forwardly extending ears 74 and 75 for fitting through mating slots 76 and 77 in the front cover 16. The ears 74 and 75 are also provided with holes for receiving the hasps of padlocks, or other locking means in order to secure the cover 16 closed and against unauthorized entrance.

Scored areas such as 79 may be provided in any of the walls, such as side wall 12, so that they may be knocked out to introduce lead wires such as 64, 65, 66 and 67 into the box 10.

It will be apparent to those skilled in the art that various changes may be made in the invention without departing from the spirit and scope thereof, and therefore the invention is not limited by that which is shown in the drawings and described in the specification, but only as indicated in the appended claims.

What is claimed is:
1. An electrical switch box comprising:
  (a) a housing having a back wall, opposed side walls, a top wall, a bottom wall, and an open front,
  (b) a cover adapted to fit over said housing to close said open front,
  (c) means for securing said cover in closed position on said housing,
  (d) an electrical switch fixed within said housing, said switch having electrical inlet contacts and electrical outlet contacts,
  (e) said bottom wall comprising a rear portion, an offset portion spaced above said rear portion and terminating in said open front, and a partition portion connecting said rear portion and said offset portion, said partition portion being spaced rearwardly of said cover in closed position to form a recess having an open bottom between said bottom wall and said closed cover,
  (f) an electrical receptacle having electrical contacts, fixed in said partition portion and opposing said cover in closed position to receive a mating electrical plug within said recess, and
  (g) electrical conduit means inside said housing connecting said switch outlet contacts to said receptacle contacts.

2. The invention according to claim 1 in which said partition portion is substantially parallel to said cover in closed position and spaced from said cover just far enough to receive and maintain said electrical plug electrically connected to said receptacle, so that said plug cannot be removed from said receptacle while said cover is in closed position.

References Cited
UNITED STATES PATENTS 2,603,546  7/1952  Lais _____ 317—120

ROBERT K. SCHAEFER, *Primary Examiner.*

H. O. JONES, *Assistant Examiner.*